3,008,622
DRIVE REEL FOR CABLEWAYS
Hartmut Arnold, Huttenweg 12, Dulmen in
Westphalia, Germany
Filed July 16, 1957, Ser. No. 672,337
Claims priority, application Germany July 17, 1956
1 Claim. (Cl. 226—190)

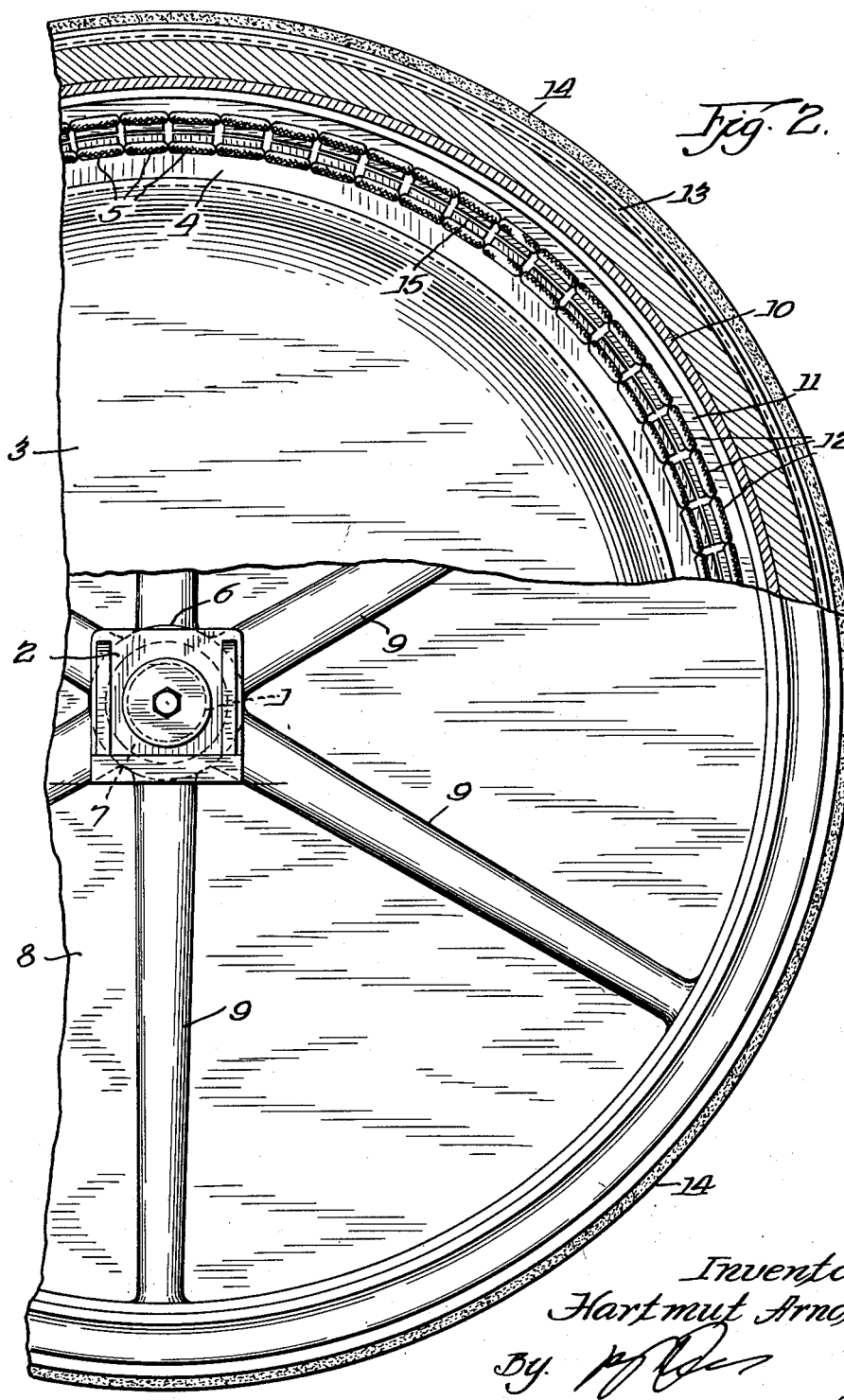

This invention is concerned with a heavy duty drive reel for cableways, for example, mine tipples, suspension ways and the like.

Driving cable reels of the above indicated kind are frequently operated by electric motors. Since the speed of rotation (r.p.m.) of such driving reels is relatively low, step-down gears with relatively high gear ratio are provided between the motor shaft and the driven reel. The rotating parts of the motor and the gear increase the total inertia considerably beyond the inherent inertia of the cable reel. It should be considered in this connection that, while the rotating masses of these parts may appear to be relatively small, their inertia moments with respect to the axis of rotation of the cable reel, must always be multiplied with the square of the gear ratio. It must further be considered that the whole drive, comprising motors and gears, has a complicated structure requiring much space.

The object of the invention is to reduce the inertia moment to be accelerated very considerably and at the same time to simplify the structure.

In accordance with the invention, the cable reel is constructed as a rotor of an electric motor. This may be done, for example, by arranging the stator circumferentially upon an intermediate disk disposed concentric with the axis of the cable reel and disposing on both sides of such disk intermediate rotatable plates embracing the rotor iron and carrying the rotor and also the cable guide.

The invention thus eliminates all those parts which represent in addition to the cable reel inertia moments to be accelerated. While the inertia moment of the cable reel is somewhat increased by the rotor-stator coils and by the rotor iron, such increase is more than compensated by the elimination of all remaining rotating parts which would otherwise be required.

An example of the invention is shown in the accompanying drawings.

FIG. 2 is a part sectional side view of the cable drive.

Figure 1:
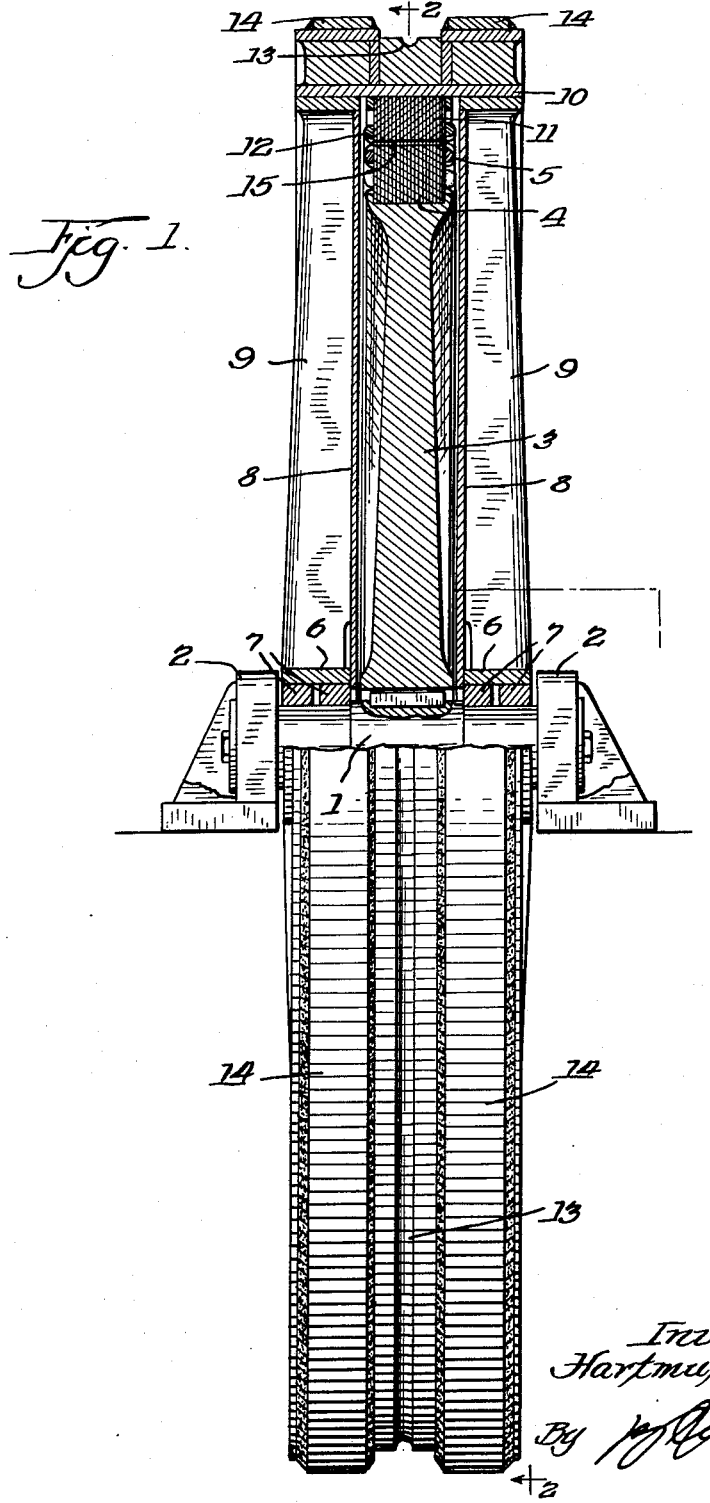
FIG. 1 is a part sectional end view of the new cable drive.

Numeral 1 indicates a stationary shaft carried by journal members 2. Keyed to the shaft 1 is a stator carrier member or plate 3 carrying circumferentially thereof the stator package 4. 5 indicates the coil heads of the stator.

Bushings 6, rotatably journalled upon bearings 7 are disposed, one on each side of the stator plate 3. Fastened to each bushing 6 is a rotor carrier member or disk 8 having laterally extending reinforcing ribs 9. The disks 8 are circumferentially interconnected by means of a tubular mounting member 10 which bridges the stator parts 4 and 5 in axial direction and carries on the inside thereof the laminated rotor package 11 having rotor windings 12. The disks 8 and the ring 10 accordingly form the rotating parts of the device. The ring 10 also carries the annular cable guide 13 and two brake members 14 to which braking forces may be applied to control the rotation of the cable guide 13. Current supply means may be provided in accordance with well known and well understood customary practice in the motor art.

The structure according to the invention may be modified in several ways. For example, the radial spacing of the air gap 15 from the axis of rotation will be in accordance with the required torque and may in some circumstances be considerably smaller. The stator plate 3 would in such a case have a reduced diameter and the rotor package 11 would be mounted upon a suitably dimensioned angular member fastened to the ring 10.

The cable guide and the brake linings may be disposed upon a centrally positioned rotatable disk or plate and the rotor and stator may in such a case be centrally separated and mounted upon annular members positioned laterally of and alongside the rotatable plate.

The particular type of the electric motor formed by the described parts may be as desired. The invention may be applied to induction motors as well as to direct current motors.

Changes may be made within the scope and spirit of the appended claim.

I claim:

A cable drive for a heavy duty cable way, comprising a stationary shaft, a pair of disklike members rotatably mounted on said stationary shaft in axially spaced relationship, said disklike members provided with radially extending laterally outwardly projecting reinforcing ribs, a tubular axially extending mounting member carried directly by said disklike members peripherally thereof and bridging the space therebetween, rotor means directly supported by said mounting member and extending therefrom radially inwardly into the space between said disklike members, a disklike plate keyed to said stationary shaft and radially extending therefrom within the space between said disklike members, stator means carried by said plate peripherally thereof for cooperation with the rotor means carried by said mounting member, an annular cable guide carried by said mounting member on the outside and centrally thereof for supporting a cable, coil means, operatively associated with at least one of said means, constructed for connection to current supply means operative to set up electromagnetic forces so as to cause rotation of said rotor means and therewith of said cable guide for the purpose of exerting driving force on said cable, and means, carried by said tubular mounting member and radially extending therefrom on either side of said cable guide, to which braking forces may be applied to control the rotation of said cable guide.

References Cited in the file of this patent

UNITED STATES PATENTS

| | | |
|---|---|---|
| 1,093,149 | Schneider | Apr. 14, 1914 |
| 1,555,094 | Adams | Sept. 29, 1925 |
| 2,126,470 | Johnson | Aug. 9, 1938 |
| 2,458,459 | Wright | Jan. 4, 1949 |